Figure 2:
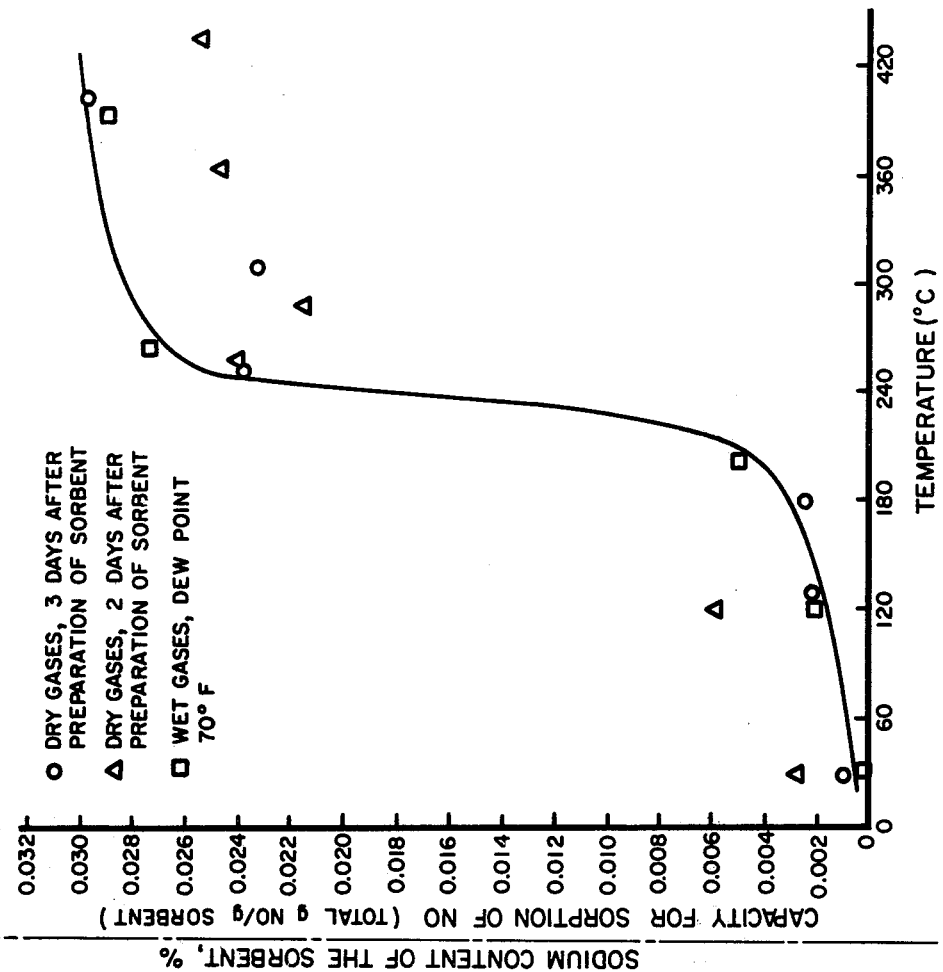

United States Patent [19]

Gidaspow et al.

[11] 4,151,124

[45] Apr. 24, 1979

[54] SORBENT COMPOSITION AND PROCESS FOR PREPARING IT

[75] Inventors: Dimitri Gidaspow, Chicago, Ill.; Hossein Hariri, Sale, England; Hamid Arastoopour, Chicago, Ill.

[73] Assignee: Institute of Gas Technology, Chicago, Ill.

[21] Appl. No.: 861,254

[22] Filed: Dec. 16, 1977

[51] Int. Cl.² ............................................. B01J 23/78
[52] U.S. Cl. ................... 252/474; 423/213.5; 423/239
[58] Field of Search ........................... 252/474, 184; 423/213.5, 239

[56] References Cited

U.S. PATENT DOCUMENTS

| 2,479,879 | 8/1949 | Teter | 252/474 X |
| 3,864,450 | 2/1975 | Takeyama et al. | 423/239 |
| 3,953,575 | 4/1976 | Gidaspow et al. | 423/239 X |

*Primary Examiner*—W. J. Shine
*Attorney, Agent, or Firm*—Thomas W. Speckman

[57] ABSTRACT

A thermally regenerable sorbent composition for removal of oxides of nitrogen from a gas stream wherein the sorbent consists essentially of about 15 to 35 wt. percent Fe, about 15 to 35 wt. percent Co and greater than about 5 wt. percent Na. The process for removal of oxides of nitrogen from a gas stream containing oxygen wherein the gas stream is passed in contact with the thermally regenerable sorbent composition described at a contact temperature of about 200° C. to 400° C. and is thermally regenerable by heating at a temperature of about 400° C. to 550° C. The process and composition is effective for gas streams where the oxides of nitrogen content is less than 2000 ppm and is particularly effective where the oxides of nitrogen content is about 50 to 1000 ppm. The composition and process is especially useful in removal of oxides of nitrogen from combustion gas effluents such as from furnaces and vehicles.

7 Claims, 2 Drawing Figures

SORBENT COMPOSITION AND PROCESS FOR PREPARING IT

This invention relates to a composition and process for removal of oxides of nitrogen ($NO_x$) from gas streams. The composition and process of this invention is especially useful in the removal of oxides of nitrogen from combustion gases such as the effluent from furnaces and vehicles. The iron oxide-cobalt oxide sorbent containing sodium of this invention has a high capacity, is thermally regenerable and is particularly effective in the temperature and concentration range of oxides of nitrogen in the effluent from power plants and other such sources.

Oxides of nitrogen have become one of the most prevalent and troublesome pollutants in today's industrialized society. Such pollution results in "smog" having an undesirable odor and being irritating to the body.

The combustion of any fuel with air as the oxidant, even such possible future fuels as hydrogen, results in the formation of oxides of nitrogen. Electric power generation by the combustion of coal and natural gas accounts for the largest source of emissions of oxides of nitrogen from stationary sources. Other stationary sources include all industrial combustion and gas plants. Internal combustion engines are a principal source of pollution by oxides of nitrogen in highly urbanized areas. Current Governmental regulations, as well as desired ecological factors, make it important to overcome the problems of removal of oxides of nitrogen in emissions to the atmosphere.

Various methods of control of emissions of oxides of nitrogen have been studied, such as two-stage combustion and flue gas recirculation. However, when the oxides of nitrogen are derived from the fuel, such as coal, combustion modifications do not reduce the oxides of nitrogen emission to desirable levels.

Much effort has been placed in the development of catalytic reactors for the removal of oxides of nitrogen from combustion gases, particularly those emitted by internal combustion engines. However, the catalytic reactors developed to date reduce the operating efficiency of the engine and do not provide a satisfacotry long term solution to the problem.

Sorption of oxides of nitrogen by a sorbent which may be regenerated is particularly attractive since it would be independent of the combustion process and overcome the disadvantages of many present catalytic processes. Sorbents have previously been used for removing oxides of nitrogen from gas streams. Molecular sieves have been used to sorb oxides of nitrogen and can be regenerated. However, molecular sieves preferentially sorb water to other gases and, as taught by U.S. Pat. No. 3,015,369 where a specially treated molecular sieve was used to reduce the $NO_x$ content of internal combustion engine exhaust gases, sorption temperatures of less than about 400° to 600° C. were practically unsuitable. Ferrous sorbents have been used to remove oxides of nitrogen from gas streams. U.S. Pat. Nos. 3,860,690 and 3,953,575 are exemplary of the use of iron oxide sorbents for regenerative sorption of $NO_x$. However, such sorbents did not have the desired high capacity for removal of oxides of nitrogen at flue gas conditions.

It is an object of this invention to overcome many of the disadvantages of the prior sorbents for the sorption of oxides of nitrogen from gas streams.

It is another object of this invention to provide a composition and process for the sorption of $NO_x$ from gas streams containing a dilute amount of $NO_x$ by a sorbent composition which may be regenerated at temperatures of below about 500° to 600° C.

It is a further object of this invention to provide a sorbent composition which has high capacity for $NO_x$ per unit of sorbent.

It is yet another object of this invention to provide a sorbent composition and process for the efficient sorption of $NO_x$ from a flue gas containing carbon dioxide, oxygen and water vapor.

It is a further object of this invention is provide a sorbent composition and process for sorption of $NO_x$ which maximizes sorption at flue gas temperatures and oxygen concentrations.

It is another object of this invention to provide a sorbent composition for sorption of $NO_x$ from gas streams and is suitable for cyclic thermal regeneration of the sorbent.

Figure 1:
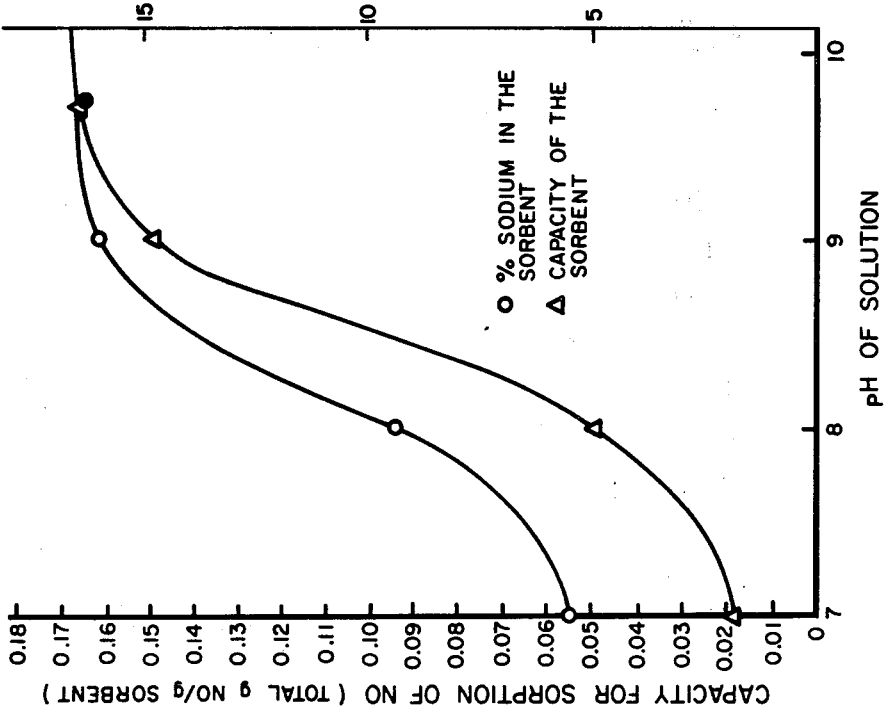

Still other and further objects of this invention will be evident from the description when taken with the drawings wherein:

FIG. 1 is a graph showing the capacity for sorption of oxides of nitrogen by sorbent compositions of this invention; and FIG. 2 is a graph showing the variation of capacity for sorption of oxides of nitrogen by sorbents of this invention dependent upon temperature.

The sorbent compositions of this invention consist essentially of about 15 to 35 wt. percent Fe, 15 to 35 wt. percent Co and greater than about 5 wt. percent Na. Preferably, about 10 to 25 wt. percent sodium is present. The metals are present principally as oxides. In the case of iron the oxides may be a mixture of $Fe_3O_4$ ($Fe_2O_3.FeO$). In the case of cobalt the oxides may be a mixture of $Co_2O_3$ and $CoO$ and principally $Co_3O_4$($Co_2O_3.CoO$). For this reason, the percentages are expressed on the basis of the metals. Especially preferred are sorbent compositions consisting essentially of about 18 to 30 wt. percent Fe, 18 to 30 wt. percent Co and 10 to 20 wt. percent Na. Preferably about 15 to 20 wt. percent Na is in the composition.

The sorbent composition can be prepared by coprecipitation of iron oxide and cobalt oxide from a solution of cobalt and iron salts to which a sodium salt has been added to obtain a high pH. Particularly suitable is the use of $FeSO_4$ and $Co(NO_3)_2$ and $Na_2CO_3$. However, other iron, cobalt and sodium salts may be suitable. Coprecipitation techniques are more fully described in the article *Iron Oxide Sorbents for Regenerative Sorption of $NO_x$*, Leung, L. and Gidaspow, D., AIChE J., 20, 840–846 (1974) and AVCO Corp., *A Survey of Metal Oxides as Sorbents for Oxides of Sulfur*, U.S. Department of Commerce, PB 185-190 (1969), the teachings of which are incorporated herein by reference in their entirety.

The sorbent composition of this invention has been found to have a capacity greater than 10% of NO per weight of sorbent and is thermally regenerable at relatively low temperatures. Further, it has been found that the $NO_x$ capacity does not vary greatly in the temperature range of 200° to 350° C. with nitric oxide concentration in the range of 400 to 800 ppm NO. The oxygen normally contained in flue gas is near the optimum concentration for highest sorption capacity of the sorbent composition of this invention. Desorption of the $NO_x$ from the sorbent composition of this invention may be achieved by passage of a stream of inert gas such as nitrogen at about 450° C. Thus, it is seen that the sorbent composition of this invention is particularly suited for nitric oxide concentrations, oxygen concentrations and temperatures of conventional flue gases.

U.S. Pat. No. 3,953,575 compares a number of prior art potential sorbents including ferric oxide and cobalt oxide showing the ferric oxide sorbents taught by that patent to be superior in several aspects to other sorbents tested. The sorbent composition of the present invention is shown to have greatly increased capacity to breakthrough, total capacity and time to breakthrough, while affording good thermal regenerability within desired temperature ranges.

The sorbent composition of this invention may be utilized in conjunction with conventional fixed bed sorbers or with suitable porous carrier or support material as more fully set forth in U.S. Pat. Nos. 3,860,690 and 3,953,575. The sorbent composition of this invention is particularly suitable for a rotary type sorption-regeneration wheel in which one portion of the sorbent is sorbing while another portion of the sorbent is being regenerated as taught by U.S. Pat. No. 3,860,690. The process of this invention for removal of oxides of nitrogen from a gas stream containing oxygen comprises passing the gas stream in contact with the sorbent composition of this invention as described at contact temperatures of about 200° to about 400° C., preferably between about 250° to 350° C. The sorbents are not appreciably affected by $CO_2$ or water vapor content and they effectively sorb $NO_x$ in the presence of oxygen which is preferably present in amounts of about 0.5 to about 10 volume percent. The sorbents and process of this invention show high efficiency for $NO_x$ concentration of up to about 2000 ppm, especially good results having been obtained with $NO_x$ concentrations of about 50 to 1000 ppm. By the terminology "dilute amounts of $NO_x$" we mean less than about 2000 ppm.

The $NO_x$ sorbed on the sorbent is readily removed by heating the sorbent to a temperature of about 400° to 550° C. Regeneration may be enhanced by flushing with an inert gas such as nitrogen. It is desired that the temperature and time for regeneration be kept to a minimal for satisfactory operation of the process to assure against unnecessary decrease of the sorption properties of the sorbent upon recycle and to lower the requirement for cooling the sorbent prior to sorption. It is apparent that after completion of the regeneration, the sorbent is ready for the sorption step and the cycle repeated.

The following Examples show some preferred embodiments of this invention and are not intended to limit the invention in any manner:

EXAMPLE I

Sorbents according to one embodiment of this invention were prepared by coprecipitation techniques more fully described in the article by Leung and Gidaspow, referred to above. The sorbents were prepared using 15.17 grams of $FeSO_4.7H_2O$ and 16.96 grams of $Co(NO_3)_2.6H_2O$. The pH of four such solutions were adjusted to 7, 8, 9 and 9.7 by the addition of $Na_2CO_3$. The coprecipitates obtained were aged for two hours, filtered, washed with deionized water and dried in air at 60° C. for one day. During drying, the coprecipitate exhibited considerable shrinkage and its color changed from blue to brown. The coprecipitates were humidity dried at 70° C. wet bulb and 90° C. dry bulb temperature for 8 hours and fired in a nitrogen atmosphere at 650° C. for 8 hours. The chemical analysis of each of the sorbents is shown in Table 1.

Table 1

| pH of Solution | Chemical Composition (Weight Percent) | | |
|---|---|---|---|
| | Fe | Co | Na |
| 7 | 28.2 | 30.3 | 5.5 |
| 8 | 24.0 | 31.1 | 9.4 |
| 9 | 19.4 | 19.8 | 16.1 |
| 9.7 | 21.1 | 22.3 | 16.5 |

The sorbent from the solution having a pH of 9.7 has a total surface area of 10 sq. meters per gram of the pores with diameters greater than 30 Angstroms. This sorbent had an average particle diameter of 0.026 centimeters, true density of 3.73 grams per cubic centimeter and particle density of 1.75 grams per cubic centimeter.

EXAMPLE II

The four sorbents prepared as described in Example I were tested for their capacity for sorption of nitric oxide. The sorption was measured in a packed tube-type reactor with the sorbent in powder form on the top of a porous quartz disc fixed in the tube. The tube was heated in a split furnace with three heating elements. A thermocouple inserted in the sorbent was used to measure the temperature of the sorbent. The sorbent was first heated in a stream of nitrogen gas at 400° C. with a flow rate of 1 liter per minute for about 30 minutes to drive out any moisture present. Nitric oxide removal was ascertained by maintaining the sorbent at 300° C. and a nitrogen stream containing 3 volume percent oxygen and a nitric oxide concentration of 700 to 775 ppm was passed through the sorbent. The mixed stream was monitored and analyzed before and after sorption with a $NO_x$ converter which converts all $NO_x$ in the stream of NO (manufactured by Thermo Electron) and the NO was measured by a nitric oxide infrared analyzer (LIRA-200 manufactured by Mine Safety Appliance Co.). The total capacity, to concentration out/concentration in=0.85, of each of the sorbents is shown in FIG. 1 expressed as total NO absorbed. The calculations were performed as more fully set forth in U.S. Pat. No. 3,953,575. Also shown in FIG. 1 is the sodium content of the sorbent. Desorption was carried out by passing a stream of nitrogen gas at 450° C. through the sorbent.

EXAMPLE III

Sorbent produced as described in Example I wherein the sodium content of the sorbent was 16.5% was used to ascertain the effect of temperature upon capacity for sorption of oxides of nitrogen. FIG. 2 shows results of sorption of oxides of nitrogen measured as NO while maintaining the sorbent at various temperatures between 30° and 430° C. For each of the tests, the oxygen concentration was maintained at 3 volume percent and the nitric oxide concentration at 690 ppm. The gas flow rate was 0.7 liters per minute through 4.0 grams of sorbent in an apparatus as described in Example II. The capacity to $C_{out}/C_{in}=0.85$ for sorption of nitric oxide was determined as described in Example II for dry gases and for wet gases having a dew point of 21° C. FIG. 2 also shows the effect of using sorbent three days and two months following its preparation.

Other tests were conducted using sorbent prepared in the same manner with testing conducted very shortly after preparation. Capacities to $C_{out}/C_{in}=0.85$ for sorption NO of up to 0.049 gNO/g sorbent were obtained with breakthrough times of up to 160 minutes.

EXAMPLE IV

Sorbent as prepared in Example I wherein the sodium content of the sorbent was 16.5% was placed in the apparatus as described in Example II. 3.74 Grams of sorbent was used with a flow rate of 0.7 liters per minute, oxygen concentration of 3 volume percent and the sorbent was maintained at 300° C. The concentration of nitric oxide in the gas passed through the sorbent was varied as shown in Table 2. The rate constant, timed to breakthrough, capacity to breakthrough and total capacity were observed and calculated as shown in Table 2.

Table 2

| | | | |
|---|---|---|---|
| NO concentration (ppm) | 420 | 630 | 790 |
| Asymptotic rate constant (liter/mole-minute) | 59 | 52 | 45 |
| Time to breakthrough (min.) | 128 | 96 | 128 |
| Capacity to breakthrough (gm NO/gm sorbent) | 0.0124 | 0.0140 | 0.0238 |
| Total capacity up to $\frac{C\ out}{C\ in}$ 0.85 (gm NO/gm sorbent) | 0.1180 | 0.1282 | 0.1245 |

It is seen that the total NO capacity is relatively insensitive to nitric oxide concentration.

EXAMPLE V

Using the same sorbent and methods of measurement as described in Example IV, the oxygen concentration of the gas stream was varied as shown in Table 3. The flow rate in each case was 0.7 liters per minute with a nitric oxide concentration of 420 ppm. 3.74 Grams of sorbent was used and the sorbent was maintained at a temperature of 300° C. The rate constant, time to breakthrough, capacity to breakthrough and total capacity of the sorbent were as set forth in Table 3.

Table 3

| | | | | | |
|---|---|---|---|---|---|
| O$_2$ concentration (Vol. %) | 0 | 0.05 | 3 | 10 | 14.3 |
| Asymptotic rate constant (liter/mole-minute) | 7152 | 72 | 90 | 117 | 164 |
| Time to breakthrough (min.) | 0 | 96 | 128 | 96 | 32 |
| Capacity to breakthrough (gm NO/gm sorbent) | 0 | 0.0106 | 0.0124 | 0.0093 | 0.0021 |
| Total capacity (gm NO/gm sorbent) | 0.001 | 0.0946 | 0.118 | 0.0906 | 0.0647 |

It is seen that the total capacity for nitric oxides is greatest at oxygen concentrations in the order of 3 volume percent.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A thermally regenerable sorbent composition for removal of oxides of nitrogen from a gas stream, said sorbent consisting essentially of iron, cobalt and sodium oxides wherein the proportions based upon the metals present are about 15 to 35 wt. percent Fe, about 15 to 35 wt. percent Co and greater than about 5 wt. percent Na.

2. The thermally regenerable sorbent composition of claim 1 wherein said Fe is present in about 18 to 30 wt. percent, said Co is present in about 18 to 30 wt. percent, and said Na is present in about 10 to 20 wt. percent.

3. The thermally regenerable sorbent composition of claim 2 wherein said Na is present in about 15 to 20 wt. percent.

4. A process for preparation of a thermally regenerable sorbent composition for removal of oxides of nitrogen from a gas stream comprising; coprecipitating iron, cobalt and sodium oxides from a solution of cobalt and iron salts raised to a pH of about 7 by addition of a sodium salt, and drying and firing the formed coprecipitates, the composition of said iron, cobalt and sodium oxides wherein the proportions based upon the metals are about 15 to 35 wt. percent iron, about 15 to 35 wt. percent cobalt and greater than about 5 wt. percent sodium.

5. A process for preparation of a thermally regenerable sorbent composition for removal of oxides of nitrogen from a gas stream comprising; coprecipitating iron, cobalt and sodium oxides from a solution of cobalt and iron salts raised to a pH of about 8 by addition of a sodium salt, and drying and firing the formed coprecipitates, the composition of said iron, cobalt and sodium oxides wherein the proportions based upon the metals are about 15 to 35 wt. percent iron, about 15 to 35 wt. percent cobalt and greater than about 5 wt. percent sodium.

6. A process for preparation of a thermally regenerable sorbent composition for removal of oxides of nitrogen from a gas stream comprising; coprecipitating iron, cobalt and sodium oxides from a solution of cobalt and iron salts raised to a pH of about 9 by addition of a sodium salt, and drying and firing the formed coprecipitates, the composition of said iron, cobalt and sodium oxides wherein the proportions based upon the metals are about 15 to 35 wt. percent iron, about 15 to 35 wt. percent cobalt and greater than about 5 wt. percent sodium.

7. A process for preparation of a thermally regenerable sorbent composition for removal of oxides of nitrogen from a gas stream comprising; coprecipitating iron, cobalt and sodium oxides from a solution of cobalt and iron salts raised to a pH of about 9.7 by addition of a sodium salt, and drying and firing the formed coprecipitates, the composition of said iron, cobalt and sodium oxides wherein the proportions based upon the metals are about 15 to 35 wt. percent iron, about 15 to 35 wt. percent cobalt and greater than about 5 wt. percent sodium.

* * * * *